United States Patent Office 3,004,974
Patented Oct. 17, 1961

3,004,974
WATER-SOLUBLE SALTS OF ANTHRA-
QUINONE DYESTUFFS
Paul Grossmann, Binningen, and Paul Rhyner, Basel,
Switzerland, assignors to Ciba Limited, Basel, Switzerland
No Drawing. Filed Dec. 21, 1959, Ser. No. 860,629
Claims priority, application Switzerland Dec. 24, 1958
6 Claims. (Cl. 260—272)

This invention provides valuable water-soluble salts of anthraquinone dyestuffs, which contain a single anthraquinone nucleus, are free from acid groups imparting solubility in water, and contain in at least one β-position a radical of the formula (1)    —NHCOA—Q⁺   X⁻ in which A represents an aliphatic or araliphatic radical, Q represents a quaternary ammonium group, and X represents an anion.

The new dyestuffs advantageously contain one or two radicals of the formula (2) 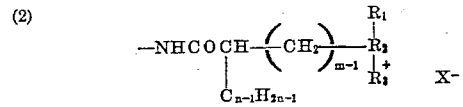

in which $R_1$, $R_2$, and $R_3$ each represent an alkyl, cycloalkyl or aralkyl radical or the radicals $R_1$, $R_2$ and $R_3$ together with the nitrogen atom form a heterocyclic ring system, for example, that of pyridine, X represents an anion, $m$ is the whole number 1 or 2, and $n$ is a whole number not greater than 8.

The invention also provides a process for the manufacture of the new dyestuffs, wherein an anthraquinone derivative, which contains a single anthraquinone nucleus, is free from acid groups imparting solubility in water, and contains in at least one β-position an amino group, is acylated with a halide of an aliphatic monocarboxylic acid, which contains (a) a quaternary ammonium group or (b) a mobile halogen atom, and, when the acylation product so obtained contains a mobile halogen atom (b), the acylation product is condensed with a tertiary amine.

The β-aminoanthraquinones used as starting materials may contain further substituents in the anthraquinone nucleus, advantageously in α-position, for example, a halogen atom or hydroxyl, alkoxy, amino, alkylamino, arylamino, acylamino or cyano group. Of special interest are compounds of the formula (3) 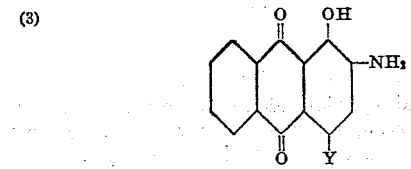

in which Y represents a hydrogen atom, a hydroxyl, amino, alkylamino or arylamino group.

As examples of suitable anthraquinone derivatives there may be mentioned:

1-hydroxy-2-aminoanthraquinone,
1:4-dihydroxy-2-aminoanthraquinone,
1:5:8-trihydroxy-2-aminoanthraquinone,
1:4:5:8-tetroxy-2-aminoanthraquinone,
1-hydroxy-2-amino-4-para-toluidinoanthraquinone,
1-hydroxy-2-amino-4-cyananthraquinone, and
1:4:5-trihydroxy-2-aminoanthraquinone.

These amino-compounds are reacted with halides of aliphatic monocarboxylic acids, advantageously with approximately one molecular proportion of the halide.

In case (a) referred to above, the aliphatic carboxylic acid halide contains a quaternary ammonium group in the alkyl radical, and is advantageously a carboxylic acid halide of the formula (4) 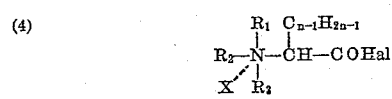

in which $R_1$, $R_2$, $R_3$, X and $n$ have the meanings given above. As an example there may be mentioned more especially betainyl dichloride and its self-condensation product of the formula

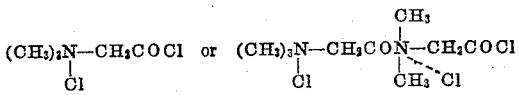

The reaction is advantageously carried out in an inert organic solvent, for example, a hydrocarbon, such as benzene, toluene or xylene; a halogenated hydrocarbon, such as carbon tetrachloride, tetrachlorethane, chlorobenzene or ortho-dichlorobenzene; or a nitro-hydrocarbon, such as nitrobenzene or nitronaphthalene, and advantageously at a raised temperature. By using a carboxylic acid halide of the formula (4) the dyestuffs of the invention are obtained in one stage.

In case (b) referred to above, there are used carboxylic acid halides which contain a mobile halogen atom in the alkyl radical, and advantageously in an α-position, and more especially halides of the formula (5) 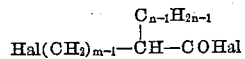

in which $m$ and $n$ have the meanings given above, for example, chloracetyl chloride, bromacetyl bromide, α-chloropropionyl chloride, β-chloropropionyl chloride, α-chlorobutyryl chloride or α-chlorphenyl-acetyl chloride.

There is advantageously used at least one molecular proportion of the acid chloride for every acylatable amino group. The acylation is carried out under conditions such that only the halogen atom bound to the carbonyl group is exchanged for the amino group. In this manner there are obtained acylation products which contain a mobile halogen atom, for example, an acylation product containing a radical of the formula (6) 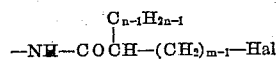

The acylation product is converted into a dyestuff of the invention by reaction with a tertiary amine, for example, trimethylamine, dimethyl-ethylamine, triethylamine, dimethyl-benzylamine, dimethyl-cyclohexylamine, pyridine or α-picoline, which tertiary amine is advantageously used in excess, and if desired, in the presence of an organic solvent.

The dyestuff salt is advantageously purified by dissolving it in water, whereupon any unreacted parent dyestuff can be filtered off as an insoluble radical. From the aqueous solution the dyestuff can be precipitated by the addition of a water-soluble salt, for example, sodium chloride.

The dyestuffs of this invention contain as the anion, advantageously the radical of a strong acid, for example, of sulfuric acid or a semi-ester thereof or of an aryl sulfonic acid, or it may be a halogen atom. The anion introduced into the dyestuff molecule during the preparation of the dyestuff may be exchanged for the anion of a different inorganic acid, for example, phosphoric acid, or of an organic acid, for example, formic acid, acetic acid, chloracetic acid, oxalic acid, lactic acid or tartaric acid. In certain cases the free bases may be used to make the salts. The dyestuff salts can also be used in the form of double salts, for example, with a halide of a metal of the second group of the periodic system, especially zinc chloride or cadmium chloride.

The dyestuff salts of this invention are suitable for dyeing a very wide variety of materials, especially tanned cellulose fibers, silk, hair or fully synthetic fibers, especially polyacrylonitrile, or polymers of asymmetrical dicyanethylene. These dyestuffs are also suitable for dyeing modified polyester fibers which contain acid groups. The dyeings produced on these fibers are distinguished by their good fastness to light.

The folowing examples illustrate the invention, the parts and percentages being by weight unless otherwise stated:

Example 1

5 parts of 1-hydroxy-2-chloracetylaminoanthraquinone (obtained by heating 1 molecular proportion of 1-hydroxy-2-aminoanthraquinone with 1 molecular proportion of chloracetyl chloride in chlorobenzene at 60–100° C.) are boiled in 50 parts of pyridine until the dyestuff is completely soluble in water. The dyestuff is filtered off and washed with benzene. There is obtained the dyestuff of the formula

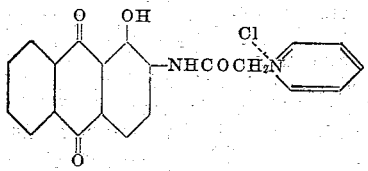

which dyes polyacrylonitrile fibers (Orlon 42 new, the word "Orlon" being a registered trademark) from weakly acid baths yellow tints of very good fastness to light.

Example 2

5 parts of 1:4-dihydroxy-2-chloracetylaminoanthraquinone (obtained by heating 1 molecular proportion of 1:4-dihydroxy-2-aminoanthraquinone with 1 molecular proportion of chloracetyl chloride in chlorobenzene at 60–100° C.) are boiled in 50 parts of pyridine in the manner described in Example 1 to yield a water-soluble orange-dyeing dyestuff of the formula

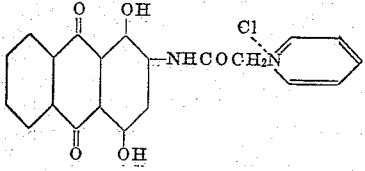

which dyes polyacrylonitrile fibers orange tints of good fastness to light.

By using, instead of 1:4-dihydroxy-2-chloracetylaminoanthraquinone, 1:4-dihydroxy-2-β-chloropropionylaminoanthraquinone (obtained by heating 1:4-dihydroxy-2-aminoanthraquinone with β-chloropropionyl chloride in chlorobenzene at 60–80° C.) or 1:4-dihydroxy-2-α-bromobutyrylaminoanthraquinone (obtained by heating 1:4-dihydroxy-2-aminoanthraquinone with α-bromobutyryl chloride in chlorobenzene at 60–80° C.), there are obtained dyestuffs which dye polyacrylonitrile fibers similar orange tints of good fastness to light.

Example 3

5.6 parts of 1-hydroxy-2-chloracetylamino-4-para-toluidinoanthraquinone (obtained by heating 1-hydroxy-2-amino-4-para-toluidino-anthraquinone with chloracetyl chloride in chlorobenzene at 60–80° C.) are boiled in 56 parts of pyridine until the dyestuff is soluble in water. The dyestuff is filtered off and washed with benzene. There is obtained a dark powder which dissolves in water with a blue coloration and dyes polyacrylonitrile fibers from acid baths reddish blue tints of good fastness to light.

Example 4

5.1 parts of 2-aminoquinizarine are heated in 30 parts of nitrobenzene for about 3 hours at 80–90° C. with 2.6 parts of dimethylaniline and 6 parts of the chloride of the formula

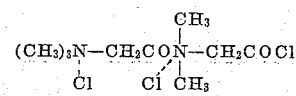

obtainable as described in Example 2 of United States Patent No. 2,359,863, patented October 10, 1944 by Adrian Laverne Linch by reacting betaine hydrochloride with thionyl chloride until the dyestuff is soluble in water with an orange coloration. The dyestuff in aqueous solution has the probable formula

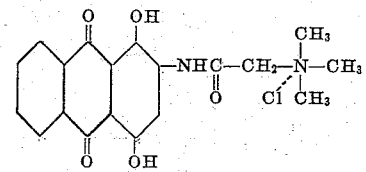

It dyes polyacrylonitrile fibers orange tints of good fastness to light.

Example 5

1 part of the dyestuff salt obtained as described in Example 1 is dissolved in 500 parts of water with the addition of 5 parts of acetic acid of 40% strength. 100 parts of boiled yarn of polyacrylonitrile staple fibers are entered into the dyebath, the temperature is raised to the boil in the course of ¼ hour, and boiling is continued for one hour. At the end of this period the dyebath is completely exhausted, and the dyeing is rinsed and dried. There is obtained a yellow dyeing of very good fastness to light.

What is claimed is:

1. An anthraquinone dyestuff of the formula

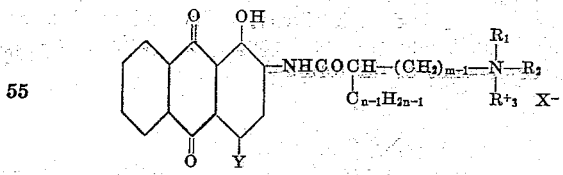

in which $R_1$, $R_2$ and $R_3$ independently represent a member selected from the group consisting of lower alkyl, cyclohexyl and benzyl and together with the nitrogen atom form a pyridine ring, $m$ is a whole number from 1–2 and $n$ is a whole number of at most 8, X represents a water-solubilizing anion and Y a member selected from the group consisting of hydrogen, hydroxyl, amino, lower alkylamino and phenylamino.

2. The dyestuff of the formula

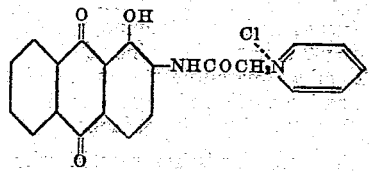

3. The dyestuff of the formula
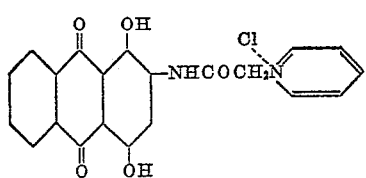
4. The dyestuff of the formula
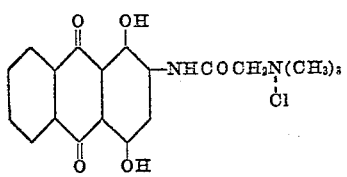
5. The dyestuff of the formula
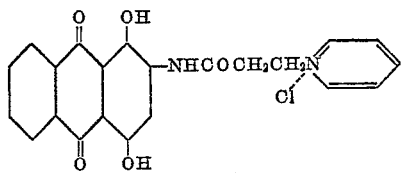
6. The dyestuff of the formula
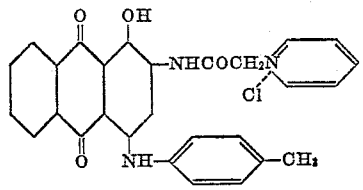
No references cited.

UNITED STATES PATENT OFFICE
CERTIFICATE OF CORRECTION

Patent No. 3,004,974　　　　　　　　　　　　October 17, 1961

Paul Grossmann et al.

It is hereby certified that error appears in the above numbered patent requiring correction and that the said Letters Patent should read as corrected below.

Column 1, formula (2) should appear as shown below instead of as in the patent:

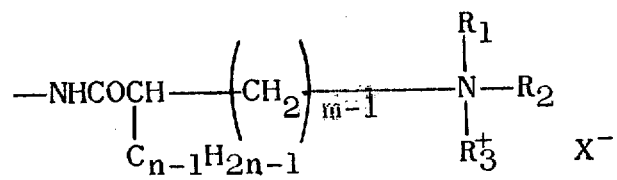

Signed and sealed this 8th day of May 1962.

(SEAL)
Attest:
ERNEST W. SWIDER
Attesting Officer

DAVID L. LADD
Commissioner of Patents